(12) United States Patent
Sinnarajah et al.

(10) Patent No.: US 8,565,191 B2
(45) Date of Patent: Oct. 22, 2013

(54) MOBILE STATION MESSAGE HAVING A STATION CLASS MARK FIELD FOR INDICATING AN MEID CAPABLE MOBILE STATION

(75) Inventors: Ragulan Sinnarajah, Markham Ontario (CA); Ravindra Patwardhan, San Diego, CA (US); Leslie Chiming Chan, San Diego, CA (US); Edward G. Tiedemann, Jr., Concord, MA (US); Walid M. Hamdy, San Diego, CA (US); Baaziz Achour, San Diego, CA (US); Philip Kenneth Price, Encinitas, CA (US); Bharat Shah, San Diego, CA (US); John Wallace Nasielski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/267,786

(22) Filed: Oct. 6, 2011

(65) Prior Publication Data

US 2012/0026981 A1    Feb. 2, 2012

Related U.S. Application Data

(62) Division of application No. 11/332,608, filed on Jan. 12, 2006, now Pat. No. 8,036,698.

(60) Provisional application No. 60/643,976, filed on Jan. 14, 2005.

(51) Int. Cl.
*H04W 4/00*    (2009.01)

(52) U.S. Cl.
USPC ........ 370/331; 370/338; 370/342; 455/550.1; 455/69

(58) Field of Classification Search
USPC ........... 370/342, 331, 338; 455/404.1, 69, 58, 455/550, 410
See application file for complete search history.

(56) References Cited

U.S. PATENT DOCUMENTS

| | | | |
|---|---|---|---|
| 5,337,345 | A | 8/1994 | Cassidy et al. |
| 6,018,656 | A | 1/2000 | Shirai |
| 6,167,261 | A | 12/2000 | Amin |
| 6,249,681 | B1 | 6/2001 | Virtanen |
| 6,549,771 | B2 | 4/2003 | Chang et al. |

(Continued)

FOREIGN PATENT DOCUMENTS

| | | |
|---|---|---|
| CN | 1500331 A | 5/2004 |
| JP | 2000004472 A | 1/2000 |

(Continued)

OTHER PUBLICATIONS

3GPP2 C.S0005-C Version 2.0, 2004. 08, pp. 2-7, 2-597,2-598, 2-599, 2-611 and 23-635.
Anonymous "TDMA Third Generation Wireless Extended Revision Guidelines (ERG) Incorporation of MEID; TIA-943" Incorporation of MEID, Oct. 2003.

(Continued)

*Primary Examiner* — David Q Nguyen
(74) *Attorney, Agent, or Firm* — Kristine O Ekwueme

(57) ABSTRACT

A mobile station for wireless communication includes a control processor configured to generate a message for transmission on a reverse signaling channel, the message including a Station Class Mark field having a plurality of bits, a portion of the Station Class Mark field indicating that the mobile station is uniquely identified by a Mobile Station Equipment Identifier.

22 Claims, 7 Drawing Sheets

(56) References Cited

U.S. PATENT DOCUMENTS

| | | | |
|---|---|---|---|
| 6,603,974 B1 | 8/2003 | Rollender | |
| 6,810,261 B1 | 10/2004 | Rollender | |
| 7,106,779 B2 | 9/2006 | Bender et al. | |
| 7,224,976 B2 | 5/2007 | Artamo et al. | |
| 7,373,146 B2 | 5/2008 | Kong et al. | |
| 7,565,130 B2* | 7/2009 | Chin et al. | 455/404.1 |
| 8,036,698 B2 | 10/2011 | Sinnarajah et al. | |
| 8,406,751 B2 | 3/2013 | Chan et al. | |
| 2001/0012786 A1* | 8/2001 | Roberts, Jr. | 455/550 |
| 2001/0036821 A1* | 11/2001 | Gainsboro et al. | 455/410 |
| 2003/0050053 A1 | 3/2003 | Wang et al. | |
| 2003/0078010 A1* | 4/2003 | Davis | 455/69 |
| 2003/0103484 A1 | 6/2003 | Oommen et al. | |
| 2004/0147242 A1 | 7/2004 | Pasanen et al. | |
| 2004/0185879 A1* | 9/2004 | Kong et al. | 455/458 |
| 2005/0073977 A1 | 4/2005 | Vanghi et al. | |
| 2005/0135403 A1 | 6/2005 | Ketchum et al. | |
| 2008/0146239 A1 | 6/2008 | Wang et al. | |

FOREIGN PATENT DOCUMENTS

| | | |
|---|---|---|
| JP | 2000261862 | 9/2000 |
| JP | 2000261863 | 9/2000 |
| JP | 2002261911 | 9/2002 |
| JP | 2003061155 | 2/2003 |
| JP | 2003122576 | 4/2003 |
| JP | 2007501580 T | 1/2007 |
| WO | 0111911 A1 | 2/2001 |
| WO | 03049381 | 6/2003 |
| WO | 2004107796 A1 | 12/2004 |

OTHER PUBLICATIONS

Anonymous "Tdoc N1-9960" Internet Article, Jun. 1, 1999.
International Search Report—PCT/US06/001422, International Search Authority—European Patent Office—Jun. 23, 2006.
Taiwan Search Report—TW095101649—TIPO—Dec. 25, 2011.
Written Opinion—PCT/US06/001422, International Search Report—European Patent Office—Jun. 23, 2006.

* cited by examiner

| FIELD | LENGTH (BITS) |
|---|---|
| 502 MOB_TERM | 1 |
| 504 SLOT_CYCLE_INDEX | 3 |
| 506 MOB_P_REV | 8 |
| 508 SCM | 8 |
| ⋮ | ⋮ |
| 518 RESERVED | 0 OR 1 |
| 520 REV FCH GATING REQ | 0 OR 1 |

| FIELD | LENGTH (BITS) |
|---|---|
| 602 QUAL_INFO_TYPE | 8 |
| 604 QUAL_INFO_LEN | 3 |
| ⋮ | ⋮ |
| 610 RECORD_TYPE | 8 |

FIG. 6A

| FIELD | LENGTH (BITS) |
|---|---|
| 642 QUAL_INFO_TYPE | 8 |
| 644 QUAL_INFO_LEN | 3 |
| 646 TYPE-SPECIFIC FIELDS | 8X QUAL_INFO_LEN |
| 648 RECORD_TYPE | 8 |
| 649 RECORD_LEN | 8 |
| 650 TYPE-SPECIFIC FIELDS | 8XRECORD_LEN |

FIG. 6B

| TYPE-SPECIFIC FIELD | LENGTH (BITS) |
|---|---|
| 682 MEID_LEN | 4 |
| 684 MEID | 8X MEID_LEN |
| 686 RESERVED | 0-7 (AS NEEDED) |

FIG. 6C

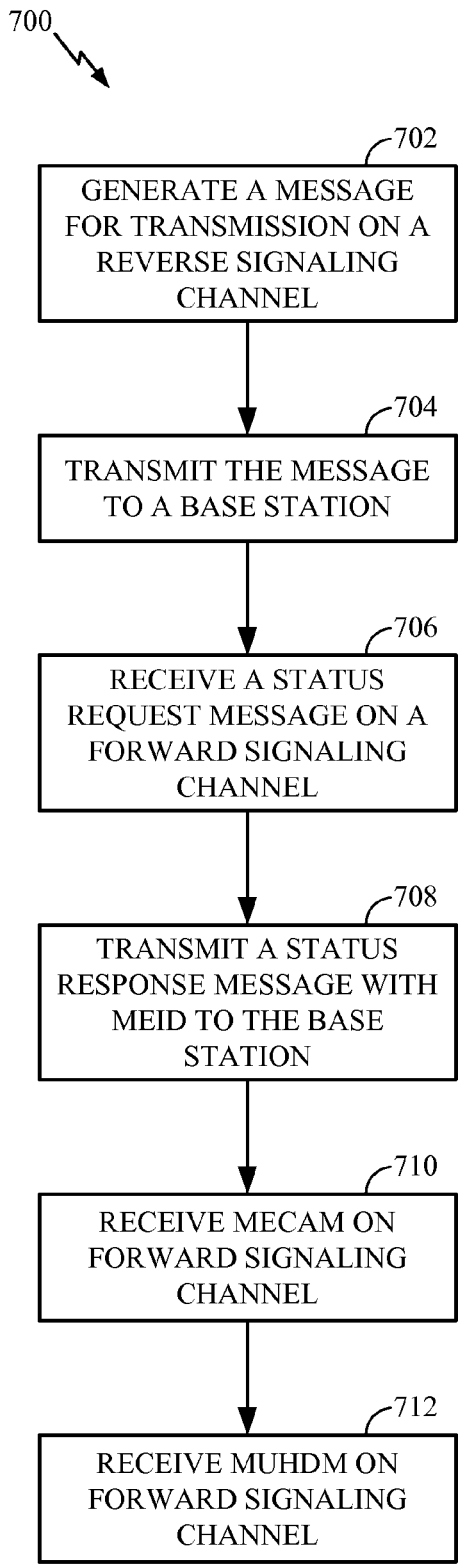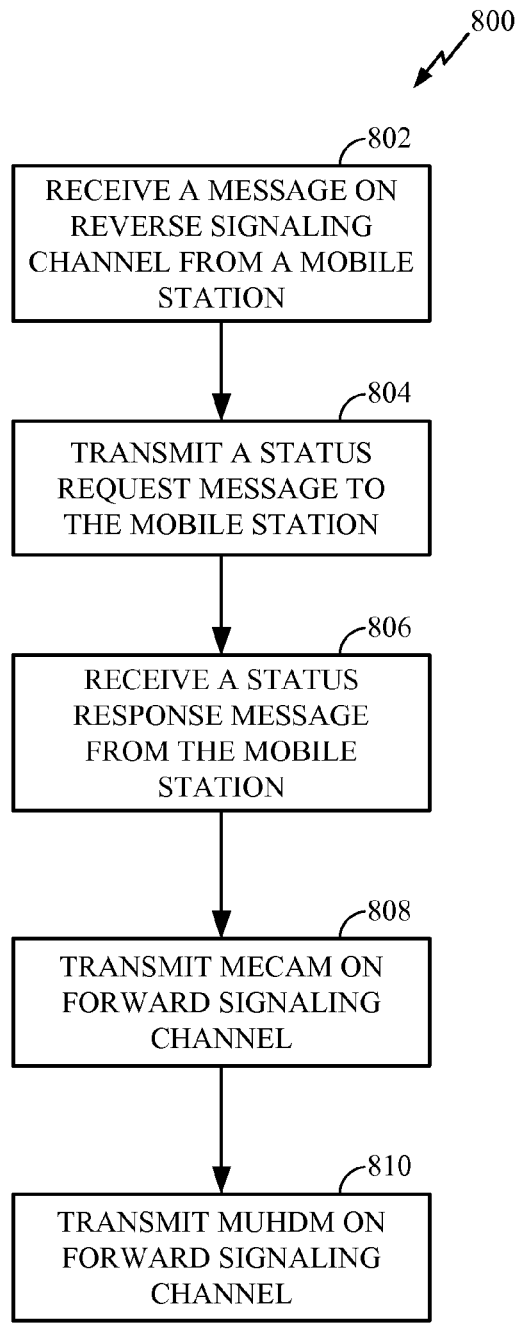
FIG. 7
FIG. 8

MOBILE STATION MESSAGE HAVING A STATION CLASS MARK FIELD FOR INDICATING AN MEID CAPABLE MOBILE STATION

CROSS-REFERENCE TO RELATED APPLICATIONS

The present Application for Patent is a divisional of, and claims priority to patent application Ser. No. 11/332,608 entitled "Mobile Station Message Having a Station Class Mark Field for Indicating an MEID Capable Mobile Station," filed Jan. 12, 2006, now U.S. Pat. No. 8,036,698 claiming priority to Provisional Application No. 60/643,976 entitled "MEID Deployment Options" filed Jan. 14, 2005, and assigned to the assignee hereof and hereby expressly incorporated by reference herein.

REFERENCE TO CO-PENDING APPLICATIONS FOR PATENT

The present Application for Patent is related to the following co-pending U.S. Patent Application: "Message Having a First Protocol Revision Field Indicating a Message Format and a Second Protocol Revision Field Indicating Mandatory Features In a Standards Revision" by Leslie Chan, application Ser. No. 11/291,678, filed Nov. 30, 2005, assigned to the assignee hereof, and expressly incorporated by reference herein.

BACKGROUND

1. Field

The present invention relates generally to wireless communication, and more specifically to cellular wireless communication.

2. Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.) Modern communication systems, such as a wireless communication system, designed to allow multiple users to access a common communications medium have been developed for such cellular systems. These modern communication systems may be based on multiple access techniques such as code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, thereby enabling an increase in the capacity of the communication system. In connection therewith, various wireless communication systems have been established including, e.g., Advanced Mobile Phone Service (AMPS), Global System for Mobile communication (GSM), and other wireless systems.

In FDMA systems, the total frequency spectrum is divided into a number of smaller sub-bands and each user is given its own sub-band to access the communication medium. Alternatively, in TDMA systems, the total frequency spectrum is divided into a number of smaller sub-bands, each sub-band is shared among a number of users, and each user is allowed to transmit in predetermined time slots using that sub-band. A CDMA system provides potential advantages over other types of systems, including increased system capacity. In CDMA systems, each user is given the entire frequency spectrum for all of the time, but distinguishes its transmission through the use of a unique code.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), and (3) the standard offered by a consortium named "3rd Generation Partnership Project 2" (3GPP2) and embodied in "TR-45.5 Physical Layer Standard for cdma2000 Spread Spectrum Systems" (the IS-2000 standard).

In the above named CDMA communication systems and standards, the available spectrum is shared simultaneously among a number of users, and suitable techniques are available to provide services, such as voice and data services.

Electronic serial numbers (ESNs), a 32 bit binary number, are currently used to uniquely identify each mobile station manufactured by the various mobile station manufacturers. In view of the proliferation of the use of mobile stations, such as cellular telephones, the ESNs may eventually be depleted and therefore, a new unique mobile station identifier was developed and standardized, known as Mobile Station Equipment Identifier (MEID) which is a 56 bit number. The MEID is one of the mandatory features in Revision D of the IS-2000 family of standards. The IS-2000 family of standards includes revisions or releases to the originally adopted IS-2000 standard identified above. Such revisions include Revisions 0, A, B, C, and D. Today, the predominant IS-2000 standard deployed is IS-2000 Revision 0 and in order for the wireless cellular operators to deploy subsequent revisions, such as Revision D, time consuming and expensive interoperability tests have to be performed to ensure that mobile stations are backward compatible with Revisions 0, A, B, and C and the network requires a suitable upgrade. However, the ESNs may be depleted before such tests and network upgrades are completed.

SUMMARY

In one aspect, a mobile station for wireless communication is disclosed. The mobile station includes a control processor configured to generate a message for transmission on a reverse signaling channel, the message including a Station Class Mark field having a plurality of bits, a portion of the Station Class Mark field indicating that the mobile station is uniquely identified by a Mobile Station Equipment Identifier.

In another aspect, a method of operating a wireless mobile station is disclosed. The method includes generating a message for transmission on a reverse signaling channel, the message including a Station Class Mark field having a plurality of bits, a portion of the Station Class Mark field indicating that the mobile station is uniquely identified by a Mobile Station Equipment Identifier.

In yet another aspect, a machine-readable medium comprising instructions, the instructions when executed by the machine, cause the machine to perform operations in a wireless mobile station is disclosed. The operations include generating a message for transmission on a reverse signaling channel, the message including a Station Class Mark field having a plurality of bits, a portion of the Station Class Mark field indicating that the mobile station is uniquely identified by a Mobile Station Equipment Identifier.

In yet another aspect, a mobile station for wireless communication is disclosed. The mobile station includes means for generating a message for transmission on a reverse signaling channel, the message including a Station Class Mark field having a plurality of bits, a portion of the Station Class Mark field indicating that the mobile station is uniquely identified by a Mobile Station Equipment Identifier, and means for transmitting the message on the reverse signaling channel.

In yet another aspect, a base station for wireless communication is disclosed. The base station includes a receiver configured to receive a message on a reverse signaling channel from a mobile station, the message including a Station Class Mark field having a plurality of bits, a portion of the Station Class Mark field indicating that the mobile station is uniquely identified by a Mobile Station Equipment Identifier.

In yet another aspect, a method of operating a base station is disclosed. The method includes receiving a message on a reverse signaling channel from a wireless mobile station, the message including a Station Class Mark field having a plurality of bits, a portion of the Station Class Mark field indicating that the mobile station is uniquely identified by a Mobile Station Equipment Identifier.

In yet another aspect, a machine-readable medium comprising instructions, the instructions when executed by the machine, cause the machine to perform operations in a base station is disclosed. The operations include receiving a message on a reverse signaling channel from a mobile station, the message including a Station Class Mark field having a plurality of bits, a portion of the Station Class Mark field indicating that the mobile station is uniquely identified by a Mobile Station Equipment Identifier.

In yet another aspect, a base station for wireless communication is disclosed. The base station includes means for receiving a message on a reverse signaling channel from a mobile station, the message including a Station Class Mark field having a plurality of bits, a portion of the Station Class Mark field indicating that the mobile station is uniquely identified by a Mobile Station Equipment Identifier, and means for transmitting a Status Request Message to the mobile station on a forward signaling channel, the Status Request Message including a request to the mobile station for the Mobile Station Equipment Identifier.

BRIEF DESCRIPTION OF THE DRAWINGS

FIG. 6A is a base station Status Request Message in accordance with an embodiment of the present invention;

FIG. 6B is a mobile station Status Response Message or an Extended Status Response Message in accordance with an embodiment of the present invention;

FIG. 6C is an MEID information record which may be included in the Status Response Message or Extended Status Response Message of FIG. 6B;

FIG. 7 is a flow diagram of a process which may be implemented by a wireless mobile station according to an embodiment of the present invention;

FIG. 8 is flow diagram of a process which may be implemented by a base station according to an embodiment of the present invention;

DETAILED DESCRIPTION

The word "exemplary" is used herein to mean "serving as an example, instance, or illustration." Any embodiment described herein as "exemplary" is not necessarily to be construed as preferred or advantageous over other embodiments.

A remote station, also known as a mobile station (MS), an access terminal (AT), user equipment (UE) or subscriber unit, may be mobile or stationary, and may communicate with one or more base stations, also known as base transceiver stations (BTSs) or node Bs. A remote station transmits and receives data packets through one or more base stations to a base station controller, also known as radio network controllers (RNCs). Base stations and base station controllers are parts of a network called an access network. An access network transports data packets between multiple remote stations. The access network may be further connected to additional networks outside the access network, such as a corporate intranet or the Internet, and may transport data packets between each remote station and such outside networks. A remote station that has established an active traffic channel connection with one or more base stations is called an active remote station, and is said to be in a traffic state. A remote station that is in the process of establishing an active traffic channel connection with one or more base stations is said to be in a connection setup state. A remote station may be any data device that communicates through a wireless channel. A remote station may further be any of a number of types of devices including but not limited to PC card, compact flash, external or internal modem, or wireless phone. The communication link through which the remote station sends signals to the base station is called an uplink, also known as a reverse link. The communication link through which a base station sends signals to a remote station is called a downlink, also known as a forward link.

Figure 1:
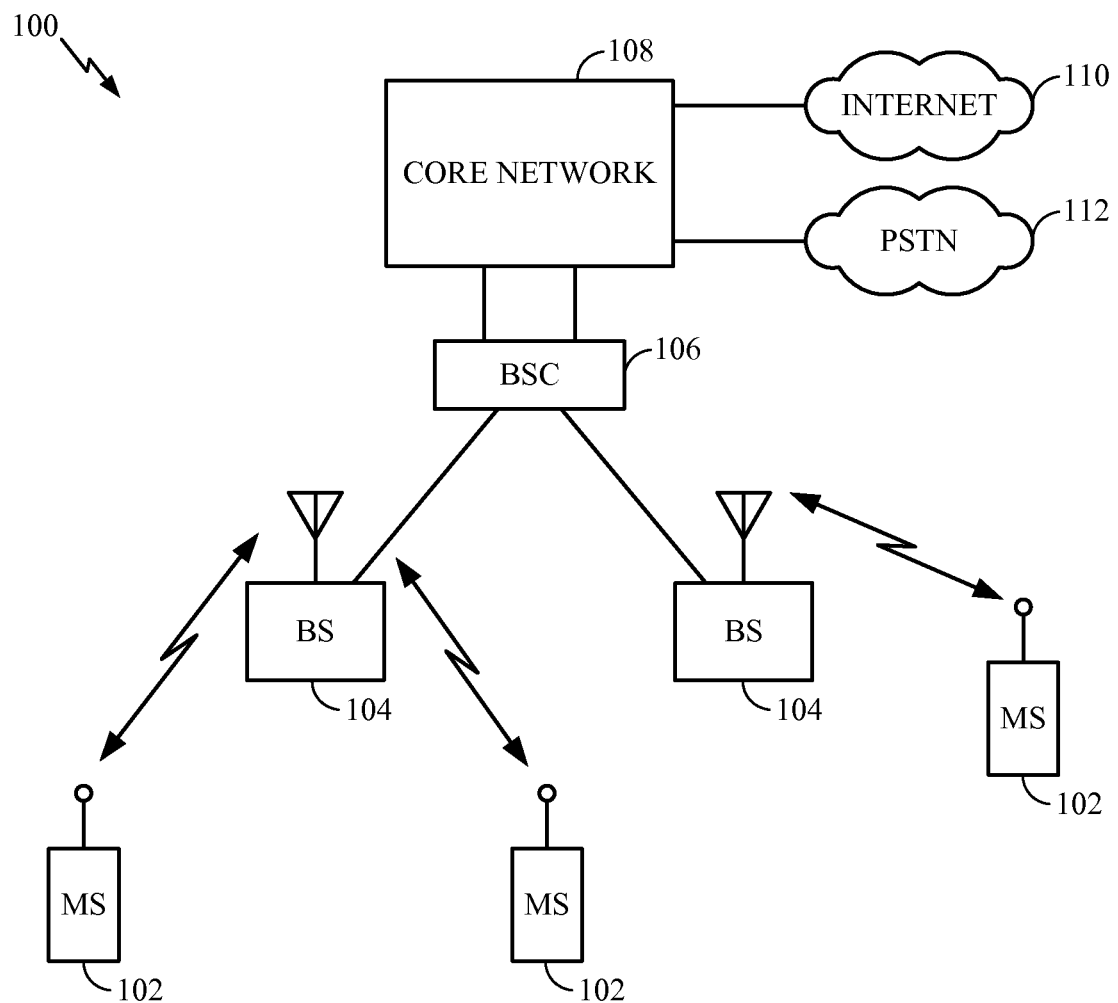
FIG. 1 is an example of a wireless communication system.

With reference to FIG. 1, an exemplary wireless communication system 100 includes one or more wireless mobile stations (MS) 102, one or more base stations (BS) 104, one or more base station controllers (BSC) 106, and a core network 108. Core network may be connected to an Internet 110 and a Public Switched Telephone Network (PSTN) 112 via suitable backhauls. Wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Figure 2:
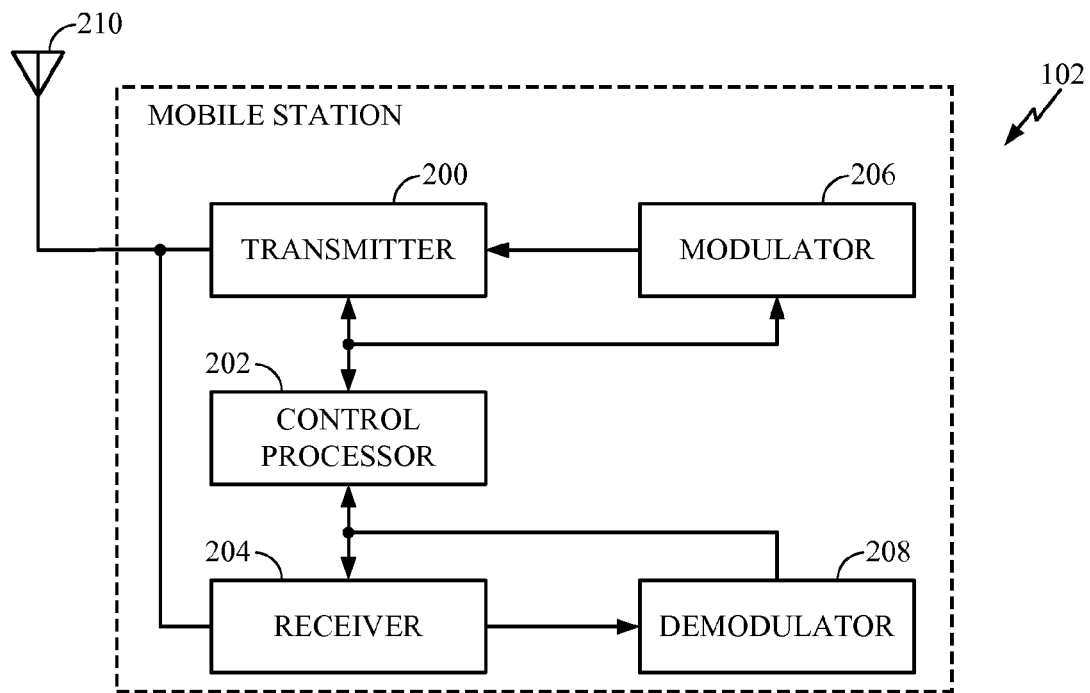
FIG. 2 is a block diagram of a wireless mobile station in accordance with an embodiment of the present invention.
Figures 5A, 5B:
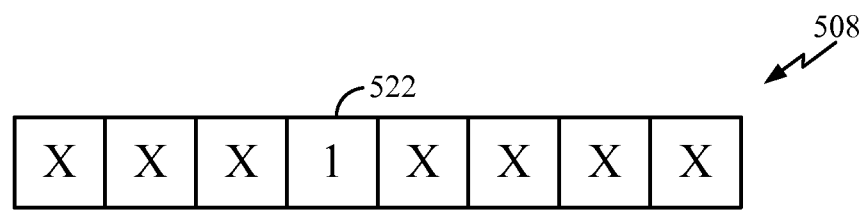
FIG. 5A is a mobile station Origination Message in accordance with an embodiment of the present invention.
FIG. 5B is the Station Class Mark field of FIG. 5A.

With reference to FIGS. 2, 5A-5B, in one embodiment, a mobile station 102 for wireless communication includes a control processor 202 configured to generate a message for transmission on a reverse signaling channel, the message including a Station Class Mark field having a plurality of bits, a portion of the Station Class Mark field indicating that the mobile station is uniquely identified by a Mobile Station Equipment Identifier. Mobile station 102 includes a transmitter 200, a modulator 206, a receiver 204, a demodulator 208, and an antenna 210, the functions of which are known in the art.

In one embodiment, the message is an Origination Message 500 as shown in FIG. 5A which includes a Station Class Mark (SCM) field 508 having a plurality of bits, such as 8 bits. In one embodiment, a portion of SCM field 508 is used to indicate that mobile station 102 is uniquely identified by a Mobile Station Equipment Identifier (MEID) and in the embodiment shown in FIG. 5B, the fourth bit 522 is set to a bit 1 to indicate that the mobile station is uniquely identified by a MEID. In alternative embodiments, the message may be a Page Response Message, a Registration Message, a Status Response Message, or an Extended Status Response Message. Continuing with FIG. 5A, Origination Message 500 includes various additional fields such as Mobile Terminated Calls Accepted Indicator (MOB_TERM) field 502, Slot Cycle Index (SLOT_CYCLE_INDEX) field 504, a Mobile Protocol Revision (MOB_P_REV) field 506, ... a reserved bit (RESERVED) field 516, and a Reverse Fundamental Gating Mode Request Indicator (REV FCH GATING REQ) field 520, the descriptions of which are known in the art.

With reference to FIGS. 4, 5A, and 6A-6B, a call setup diagram 400 between a wireless mobile station, such as mobile station 102, and a base station, such as base station 104, in accordance with an embodiment of the present invention is shown. At step 402, mobile station 102 sends Origination Message 500 or alternatively a Page Response Message, to base station 104 on a Reverse Common Signaling Channel (r-csch). Origination Message 500 includes IMSI+pESN (International Mobile Subscriber Identity and pseudo Electronic Serial Number) and SCM 508 in which bit 4 of SCM 508 is set to 1. Base station 104 may optionally send a Status Request Message (to be described later) including an MEID request to mobile station 102 on a Forward Common Signaling Channel (f-csch) and mobile station 102 sends an Extended Status Response Message (to be described later) on r-csch to base station 104, denoted by the steps within 404. The Extended Status Response Message includes the MEID of mobile station 102. In an alternative embodiment, the Status Request Message including the MEID request may be sent on a Forward Dedicated Signaling Channel (f-dsch) and a Status Response Message having the MEID may be sent on a Reverse Dedicated Signaling Channel (r-dsch).

Figure 4:
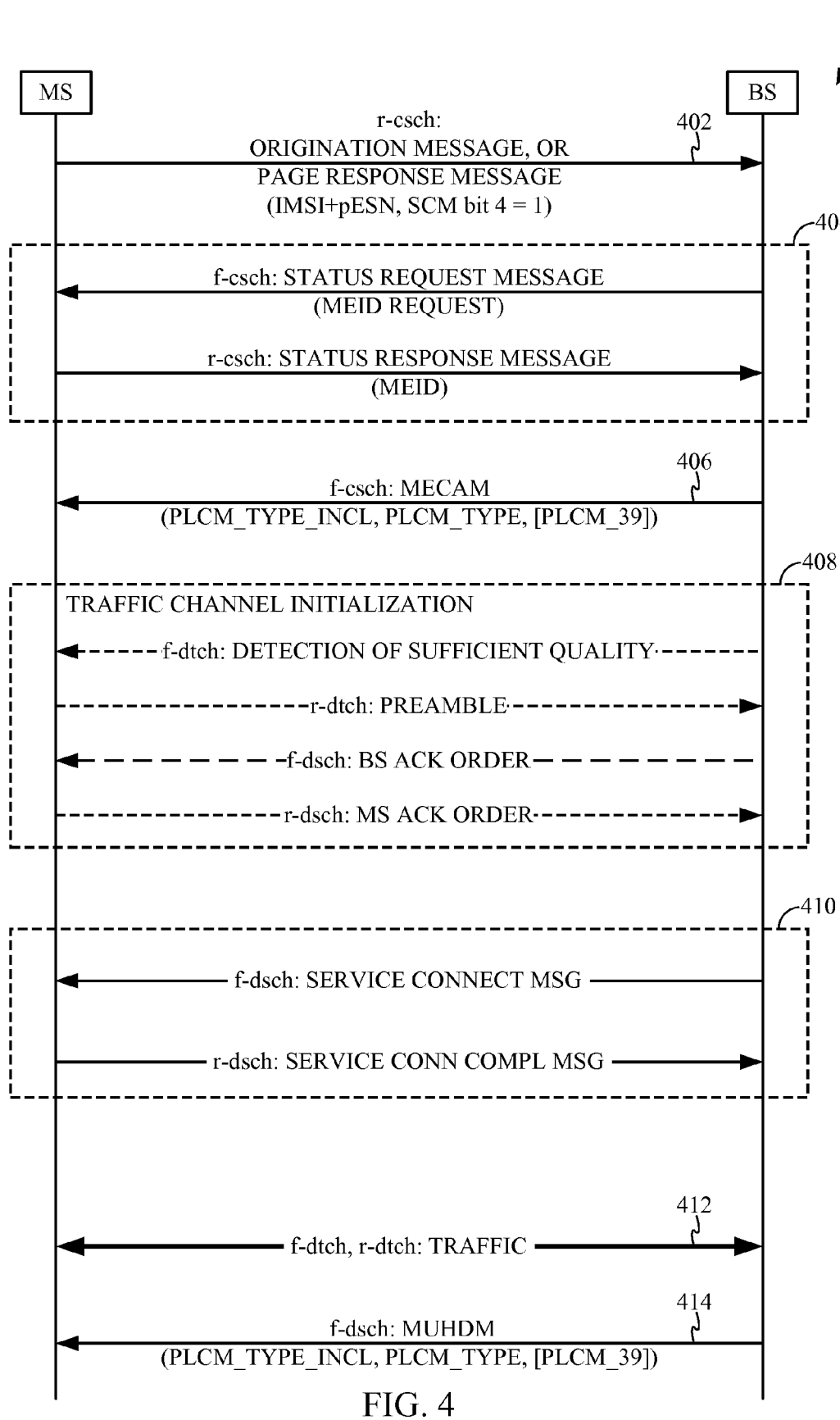
FIG. 4 is a call setup diagram between a wireless mobile station and a base station in accordance with an embodiment of the present invention.

Continuing with FIG. 4, at step 406, base station 104 sends on f-csch an MECAM (MEID Extended Channel Assignment Message) message which includes various fields such as PLCM_TYPE_INCL, PLCM_TYPE, and PLCM_39 (to be described later). Traffic channel initialization steps are depicted within 408 which include base station 104 sending on a Forward Dedicated Traffic Channel (f-dtch) a suitable signal for enabling mobile station 102 to acquire the forward link, mobile station 102 sending on a Reverse Dedicated Traffic Channel (r-dtch) a preamble to base station 104 after the mobile station acquires the forward link, base station 104 sending on f-dsch a BS Acknowledgement (ACK) Order to mobile station 102 after acquiring the reverse link, and mobile station 102 sending on a Reverse Dedicated Signaling Channel (r-dsch) an MS ACK order to base station 104. Service connect messages are then sent as denoted by the steps within 410 which include base station 104 sending a Service Connect Message on f-dsch to mobile station 102 which in turn sends a Service Connection Complete Message on r-dsch to base station 104. At step 412, traffic channels (f-dtch, r-dtch) are established in both the forward and reverse link directions. In one embodiment, at step 414, base station 104 may send a MUHDM (MEID Universal Handoff Direction Message) message to mobile station 102 on f-dsch for facilitating a handoff operation with another base station.

Continuing with FIGS. 6A and 6B, a Status Request Message 600 and a Status Response Message or Extended Status Response Message 640 are shown in accordance with an embodiment of the present invention. Status Request Message 600 includes various fields, such as a QUAL_INFO_TYPE field 602 for indicating the qualification information type, a QUAL_INFO_LEN field 604 for indicating the qualification information length, and a RECORD_TYPE field 610 for indicating an MEID request to a mobile station dependent on a suitable value of the 8 bit field. Status Response Message or Extended Status Response Message 640 includes various Layer 3 fields, such as a QUAL_INFO_TYPE field 642, a QUAL_INFO_LEN field 644 for indicating qualification information length, a Type-Specific Fields field 646, a RECORD_TYPE field 648, a RECORD_LEN field 649, and a TYPE-SPECIFIC FIELDS field 650 having the MEID value of the mobile station sending Status Response Message 640. Fields 648, 649, and 650 may be duplicated as needed. In one embodiment, if the RECORD-TYPE field 648 has a decimal value of 39, the RECORD_LEN field 649 has a decimal value of 8 and field 650 includes the MEID information as shown in FIG. 6C which shows an MEID information record 680 having MEID_LEN field 682, MEID field (56 bits) 684, and a RESERVED field 686 having 4 bits, all zeros. In one embodiment, the Status Response Message is used on the Reverse Dedicated Signaling Channel. In another embodiment, an Extended Status Response Message having the same Layer 3 format as shown in FIG. 6B is used on the Reverse Common Signaling Channel.

With reference to FIG. 7, a flow diagram of a process 700 which may be implemented by mobile station 102 according to an embodiment of the present invention is shown. Process 700 includes at 702 generate a message (e.g., Origination Message 500) for transmission on a reverse signaling channel, the message including a Station Class Mark field having a plurality of bits, a portion of the Station Class Mark field indicating that the mobile station is uniquely identified by a Mobile Station Equipment Identifier, at 704 transmit message 500 to base station 104, at 706 receive Status Request Message 600 on a forward signaling channel from base station 104, and at 708, transmit Status Response Message 640 with MEID to base station 104. At 710, mobile station 102 receives an MECAM message on a forward signaling channel from base station 104 and at 712, mobile station 102 may receive an MUHDM message (to be described later) on a forward signaling channel from base station 104 for a handoff operation to another base station.

Figure 3:
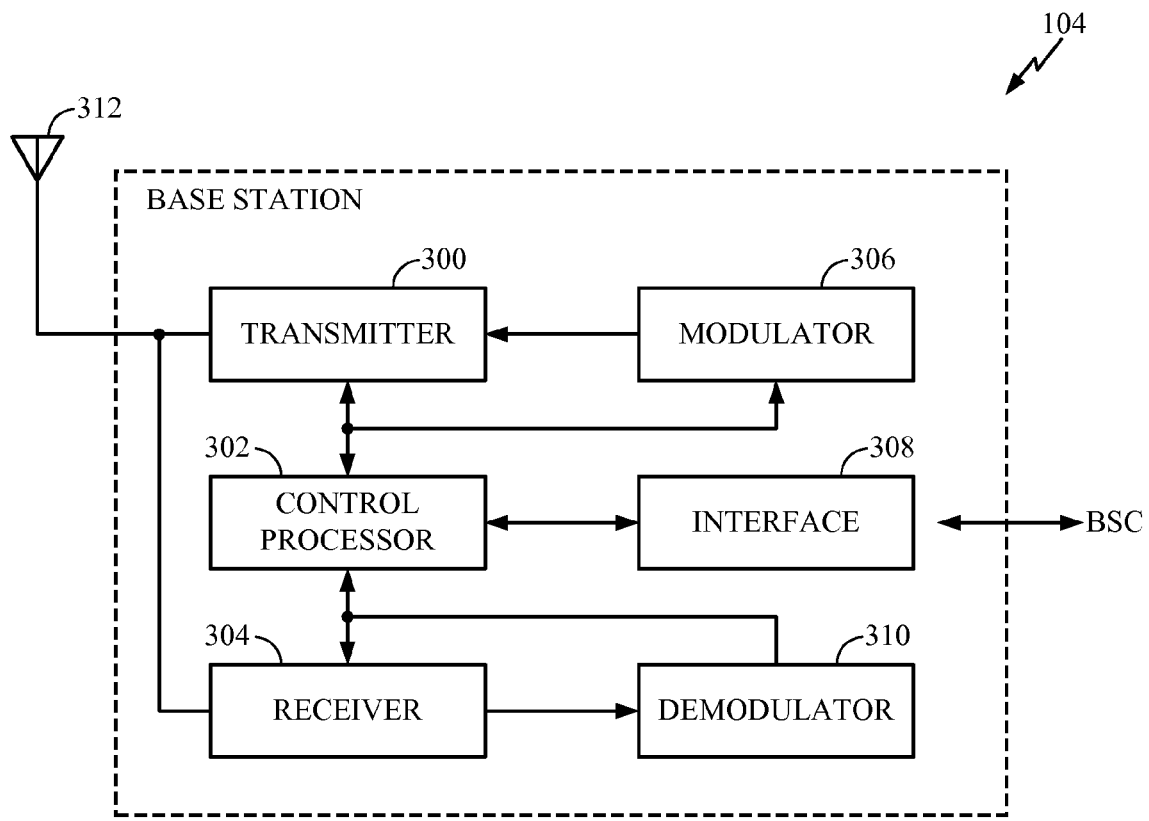
FIG. 3 is a block diagram of a base station in accordance with an embodiment of the present invention.

With reference to FIG. 3, in one embodiment, base station 104 for wireless communication includes a receiver 304 configured to receive a message on a reverse signaling channel from a mobile station, the message including a Station Class Mark field having a plurality of bits, a portion of the Station Class Mark field indicating that the mobile station is uniquely identified by a Mobile Station Equipment Identifier. In one embodiment, the message is an Origination Message 500 as shown in FIG. 5A which includes a Station Class Mark (SCM) field 508 having a plurality of bits, such as 8 bits. In the embodiment shown in FIG. 5B, a logical one ("1") represented by the fourth bit 522 is used to indicate that mobile station 102 is uniquely identified by a Mobile Station Equipment Identifier (MEID). In alternative embodiments, the message may be a Page Response Message, a Registration Message, a Status Response Message, or an Extended Status Response Message.

Continuing with FIG. 3, base station 104 includes a modulator 306, an interface 308 for communicating with a BSC, such as BSC 106 shown in FIG. 1, a transmitter 300, a control processor 302, a demodulator 310, and an antenna 312, the functions of which are known in the art. Transmitter 300 is configured to transmit a Status Request Message 600 to the mobile station on a forward signaling channel, Status Request Message 600 including a request to the mobile station for the Mobile Station Equipment Identifier. In one embodiment, the transmitter and the receiver in either the mobile station or the base station may be separate components as shown. In another embodiment, the transmitter and receiver in either the mobile station or the base station may be a single component, commonly referred to as a "transceiver."

With reference to FIG. 8, a flow diagram of a process 800 which may be implemented by base station 104 according to an embodiment of the present invention is shown. Process 800 includes at 802, receive a message on a reverse signaling channel from a mobile station, the message including a Station Class Mark field having a plurality of bits, a portion of the Station Class Mark field indicating that the mobile station is uniquely identified by a Mobile Station Equipment Identifier, at 804 transmit a Status Request Message to the mobile station on a forward signaling channel, the Status Request Message including a request to the mobile station for the MEID, and at 806, receive a Status Response Message from the mobile station. At 808, base station 104 transmits an MECAM message on a forward signaling channel, and at 810, transmits an MUHDM message on a forward signaling channel.

Figure 9A:
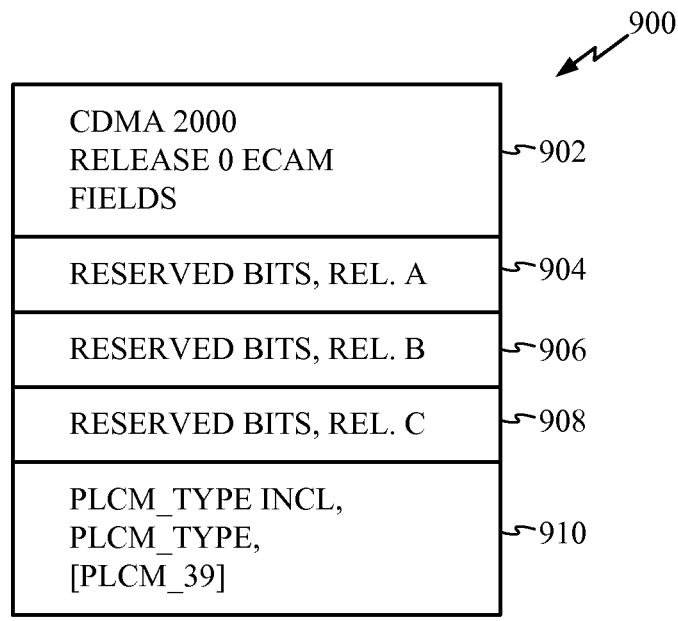
FIG. 9A is an MECAM message according to an embodiment of the present invention.

With reference to FIG. 9A, an MECAM message 900 according to an embodiment of the present invention is shown which may be transmitted by base station 104 to mobile station 102 (see FIG. 1). MECAM message 900 is formatted in the same manner as a CDMA 2000 Release D ECAM message and includes an Extended Channel Assignment Message fields 902 conforming to CDMA 2000 Release 0 standard, a fixed number of reserved bits to cover Extended Channel Assignment Message fields conforming to at least one of CDMA 2000 Release A, Release B, and Release C standards (904, 906, 908), and a Public Long Code Mask type (PLCM_TYPE) field identifying a Public Long Code Mask assigned to the mobile station for a traffic call, the PLCM_TYPE field being one of various PLCM related fields represented by 910. In the embodiment shown in FIG. 9A, the reserved bits (e.g., bit zeros) 904-908 represent the ECAM fields for the CDMA 2000 Releases A, B, and C. For example, an MECAM message may have field 904 include either 2 or 5 bits of zeros, no information in field 906, and field 908 may have one bit set to zero. In addition, if PLCM_TYPE INCL is a bit 1, then PLCM_TYPE field is included which may be one of several types such as BS assigned, MEID-based, or IMSI-based PLCM. The use of such PLCM types avoids PLCM collisions which may occur if the PLCMs are based on pseudo ESNs. In the embodiment shown in FIG. 9A, the [PLCM_39] field denotes that the PLCM is a BS assigned PLCM. If the PLCM_TYPE INCL field is a bit 0, then the next two following PLCM related fields are not included in the message.

Figure 9B:
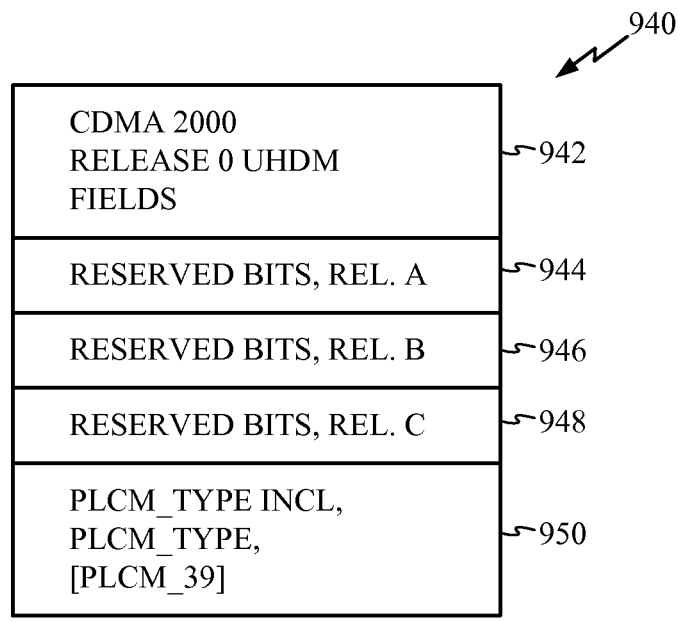
FIG. 9B is an MUHDM message according to an embodiment of the present invention.

With reference to FIG. 9B, an MUHDM message 940 according to an embodiment of the present invention is shown which may be transmitted by base station 104 to mobile station 102 (see FIG. 1). MUHDM message 940 is formatted in the same manner as a CDMA 2000 Release D UHDM message and includes a Universal Handoff Direction Message fields 942 conforming to CDMA 2000 Release 0 standard, a fixed number of reserved bits to cover Universal Handoff Direction Message fields conforming to at least one of CDMA 2000 Release A, Release B, and Release C standards (944, 946, 948), and a Public Long Code Mask type (PLCM_TYPE) field identifying a Public Long Code Mask assigned to the mobile station for a handover operation with another base station, the PLCM_TYPE field being one of various PLCM related fields represented by 950. In the embodiment shown in FIG. 9B, the reserved bits (e.g., bit zeros) 944-948 represent the UHDM fields for the CDMA 2000 Releases A, B, and C. For example, an MUHDM message may have field 944 include any one of 2-7 bits of zeros, no information in field 946, and field 948 may have 6 bits, all set to zero. In addition, if PLCM_TYPE INCL is a bit 1, then PLCM_TYPE field is included which may be one of several types such as BS assigned, MEID-based, or IMSI-based PLCM. The use of such PLCM types avoids PLCM collisions which may occur if the PLCMs are based on pseudo ESNs. In the embodiment shown in FIG. 9B, the PLCM_39 denotes that the PLCM is a BS assigned PLCM. If the PLCM_TYPE INCL field is a bit 0, then the next two following PLCM related fields are not included in the message.

In another aspect of the present invention, a machine-readable medium comprising instructions, the instructions when executed by the machine, cause the machine to perform operations in a wireless mobile station is disclosed. The operations include generating a message for transmission on a reverse signaling channel, the message including a Station Class Mark field having a plurality of bits, a portion of the Station Class Mark field indicating that the mobile station is uniquely identified by a Mobile Station Equipment Identifier.

In one embodiment, the machine-readable medium may be a disk based medium such as a CD-ROM.

In yet another aspect of the present invention, a mobile station for wireless communication is disclosed. The mobile station includes means for generating a message for transmission on a reverse signaling channel, the message including a Station Class Mark field having a plurality of bits, a portion of the Station Class Mark field indicating that the mobile station is uniquely identified by a Mobile Station Equipment Identifier, and means for transmitting the message on the reverse signaling channel. Such a means for generating may suitably include control processor 202 as shown, for example, in FIG. 2, and the means for transmitting may suitably include transmitter 200 also shown in FIG. 2.

In yet another aspect of the present invention, a machine-readable medium comprising instructions, the instructions when executed by the machine, cause the machine to perform operations in a base station, is disclosed. The operations include receiving a message on a reverse signaling channel from a mobile station, the message including a Station Class Mark field having a plurality of bits, a portion of the Station Class Mark field indicating that the mobile station is uniquely identified by a Mobile Station Equipment Identifier.

In yet another aspect of the present invention, a base station for wireless communication is disclosed. The base station includes means for receiving a message on a reverse signaling channel from a mobile station, the message including a Station Class Mark field having a plurality of bits, a portion of the Station Class Mark field indicating that the mobile station is uniquely identified by a Mobile Station Equipment Identifier, and means for transmitting a Status Request Message to the mobile station on a forward signaling channel, the Status Request Message including a request to the mobile station for the Mobile Station Equipment Identifier. Such a means for receiving may suitably include receiver 304 shown in FIG. 3, and the means for transmitting may suitably include transmitter 300 also shown in FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A base station for wireless communication, the base station comprising:
  a receiver configured to receive a message on a reverse signaling channel from a mobile station, the message including a Station Class Mark field having a plurality of bits, a portion of the Station Class Mark field indicating that the mobile station is uniquely identified by a Mobile Station Equipment Identifier.

2. The base station of claim 1, wherein the reverse signaling channel is a Reverse Common Signaling Channel.

3. The base station of claim 1, further comprising:
  a transmitter configured to transmit on a forward signaling channel, an MEID Extended Channel Assignment Message including:
    an Extended Channel Assignment Message fields conforming to CDMA 2000 Release 0 standard;
    a fixed number of reserved bits to cover Extended Channel Assignment Message fields conforming to at least one of CDMA 2000 Release A, Release B, and Release C standards; and
    a Public Long Code Mask type field identifying a Public Long Code Mask assigned to the mobile station for a traffic call.

4. The base station of claim 3, wherein the transmitter is further configured to transmit on a forward signaling channel, an MEID Universal Handoff Direction Message including:
  a Universal Handoff Direction Message fields conforming to CDMA 2000 Release 0 standard;
  a fixed number of reserved bits to cover Universal Handoff Direction Message fields conforming to at least one of CDMA 2000 Release A, Release B, and Release C standards; and
  a Public Long Code Mask type field identifying a Public Long Code Mask assigned to the mobile station for a handoff operation.

5. The base station of claim 1, wherein the message is selected from a group including an Origination Message, a Page Response Message, a Registration Message, a Status Response Message, and an Extended Status Response Message.

6. The base station of claim 1, further comprising:
  a transmitter configured to transmit a Status Request Message to the mobile station on a forward signaling channel, the Status Request Message including a request to the mobile station for the Mobile Station Equipment Identifier.

7. The base station of claim 6, wherein the forward signaling channel used for transmission of the Status Request Message is a Forward Common Signaling Channel.

8. The base station of claim 6, wherein the forward signaling channel used for transmission of the Status Request Message is a Forward Dedicated Signaling Channel.

9. A method of operating a base station, comprising:
  receiving a message on a reverse signaling channel from a wireless mobile station, the message including a Station Class Mark field having a plurality of bits, a portion of the Station Class Mark field indicating that the mobile station is uniquely identified by a Mobile Station Equipment Identifier.

10. The method of claim 9, further comprising:
  transmitting a Status Request Message to the mobile station on a forward signaling channel, the Status Request Message including a request to the mobile station for the Mobile Station Equipment Identifier.

11. The method of claim 10, wherein the forward signaling channel used for transmission of the Status Request Message is a Forward Common Signaling Channel.

12. The method of claim 10, wherein the forward signaling channel used for transmission of the Status Request Message is a Forward Dedicated Signaling Channel.

13. The method of claim 9, further comprising:
transmitting on a forward signaling channel, an MEID Extended Channel Assignment Message including:
an Extended Channel Assignment Message fields conforming to CDMA 2000 Release 0 standard;
a fixed number of reserved bits to cover Extended Channel Assignment Message fields conforming to at least one of CDMA 2000 Release A, Release B, and Release C standards; and
a Public Long Code Mask type field identifying a Public Long Code Mask assigned to the mobile station for a traffic call.

14. The method of claim 13, further comprising:
transmitting on a forward signaling channel, an MEID Universal Handoff Direction Message including:
a Universal Handoff Direction Message fields conforming to CDMA 2000 Release 0 standard;
a fixed number of reserved bits to cover Universal Handoff Direction Message fields conforming to at least one of CDMA 2000 Release A, Release B, and Release C standards; and
a Public Long Code Mask type field identifying a Public Long Code Mask assigned to the mobile station for a handoff operation.

15. A machine-readable medium comprising instructions, the instructions when executed by the machine, cause the machine to perform operations in a base station comprising:
receiving a message on a reverse signaling channel from a mobile station, the message including a Station Class Mark field having a plurality of bits, a portion of the Station Class Mark field indicating that the mobile station is uniquely identified by a Mobile Station Equipment Identifier.

16. A base station for wireless communication, the base station comprising:
means for receiving a message on a reverse signaling channel from a mobile station, the message including a Station Class Mark field having a plurality of bits, a portion of the Station Class Mark field indicating that the mobile station is uniquely identified by a Mobile Station Equipment Identifier; and
means for transmitting a Status Request Message to the mobile station on a forward signaling channel, the Status Request Message including a request to the mobile station for the Mobile Station Equipment Identifier.

17. The base station of claim 16, wherein the reverse signaling channel is a Reverse Common Signaling Channel.

18. The base station of claim 16, further comprising:
means for transmitting on a forward signaling channel, an MEID Extended Channel Assignment Message including:
an Extended Channel Assignment Message fields conforming to CDMA 2000 Release 0 standard;
a fixed number of reserved bits to cover Extended Channel Assignment Message fields conforming to at least one of CDMA 2000 Release A, Release B, and Release C standards; and
a Public Long Code Mask type field identifying a Public Long Code Mask assigned to the mobile station for a traffic call.

19. The base station of claim 18, further comprising:
means for transmitting on a forward signaling channel, an MEID Universal Handoff Direction Message including:
a Universal Handoff Direction Message fields conforming to CDMA 2000 Release 0 standard;
a fixed number of reserved bits to cover Universal Handoff Direction Message fields conforming to at least one of CDMA 2000 Release A, Release B, and Release C standards; and
a Public Long Code Mask type field identifying a Public Long Code Mask assigned to the mobile station for a handoff operation.

20. The base station of claim 16, wherein the message is selected from a group including an Origination Message, a Page Response Message, a Registration Message, a Status Response Message, and an Extended Status Response Message.

21. The base station of claim 20, wherein the forward signaling channel used for transmission of the Status Request Message is a Forward Common Signaling Channel.

22. The base station of claim 20, wherein the forward signaling channel used for transmission of the Status Request Message is a Forward Dedicated Signaling Channel.

* * * * *